United States Patent
Scharkowski

(10) Patent No.: US 12,074,343 B2
(45) Date of Patent: Aug. 27, 2024

(54) BATTERY CELL CONNECTOR

(71) Applicant: Auto-Kabel Management GmbH, Hausen i.W. (DE)

(72) Inventor: Oliver Scharkowski, Cottbus (DE)

(73) Assignee: Auto-Kabel Management GmbH, Hausen i.W. (DE)

(*) Notice: Subject to any disclaimer, the term of this patent is extended or adjusted under 35 U.S.C. 154(b) by 57 days.

(21) Appl. No.: 17/056,799

(22) PCT Filed: Feb. 22, 2019

(86) PCT No.: PCT/EP2019/054433
§ 371 (c)(1),
(2) Date: Nov. 19, 2020

(87) PCT Pub. No.: WO2019/223912
PCT Pub. Date: Nov. 28, 2019

(65) Prior Publication Data
US 2021/0126322 A1    Apr. 29, 2021

(30) Foreign Application Priority Data
May 23, 2018    (DE) .............. 10 2018 112 313.2

(51) Int. Cl.
*H01M 50/528*    (2021.01)
*H01M 50/50*    (2021.01)
(Continued)

(52) U.S. Cl.
CPC ......... *H01M 50/528* (2021.01); *H01M 50/50* (2021.01); *H01M 50/503* (2021.01);
(Continued)

(58) Field of Classification Search
CPC .... H01R 4/48; H01M 50/503; H01M 50/528; H01M 50/50; H01M 50/522;
(Continued)

(56) References Cited

U.S. PATENT DOCUMENTS 5,217,383 A * 6/1993 Hildebrandt ......... H01R 13/193 439/259
7,387,548 B2 * 6/2008 Takehara ............ H01R 13/187 439/856

(Continued)

FOREIGN PATENT DOCUMENTS

| DE | 10 2008 044 492 A1 | 4/2009 |
|----|-----|-----|
| DE | 202011106222 U1 | 2/2012 |

(Continued)

OTHER PUBLICATIONS

Deutsche Norm (Din EN 10089. ICS 77.140.25. German Standards. Apr. 2003). https://fdocuments.us/document/en-10089-spring-steels.html.*

(Continued)

*Primary Examiner* — Stephen J Yanchuk
(74) *Attorney, Agent, or Firm* — Sunstein LLP

(57) ABSTRACT

The present invention relates to a battery cell connector having at least two terminal clamps, each having a receiving area and a connection area, and at least one flat part, wherein the receiving area of at least one of the terminal clamps is arranged for clampingly receiving the flat part, and the connection area of at least one of the terminal clamps is arranged for connecting to a pole of a battery cell in a material bond.

18 Claims, 4 Drawing Sheets

(51) Int. Cl.
*H01M 50/503* (2021.01)
*H01M 50/522* (2021.01)
*H01M 50/526* (2021.01)
*H01R 4/48* (2006.01)
*H01M 50/213* (2021.01)

(52) U.S. Cl.
CPC ....... *H01M 50/522* (2021.01); *H01M 50/526* (2021.01); *H01R 4/48* (2013.01); *H01M 50/213* (2021.01); *H01M 2220/20* (2013.01)

(58) Field of Classification Search
CPC ..... H01M 50/526; H01M 50/213; F16B 2/02; F16B 2/04; F16B 2/005; F16B 2/00
See application file for complete search history.

(56) References Cited

U.S. PATENT DOCUMENTS

| | | | | |
|---|---|---|---|---|
| 8,142,238 B2* | 3/2012 | Heigl | ................. | H01R 13/187 |
| | | | | 439/843 |
| 2009/0075163 A1* | 3/2009 | Shevock | ............ | H01M 50/502 |
| | | | | 429/121 |
| 2009/0104518 A1* | 4/2009 | Nedelec | ................ | H01G 4/232 |
| | | | | 429/161 |
| 2013/0306353 A1 | 11/2013 | Zhao | | |
| 2015/0147637 A1* | 5/2015 | He | ..................... | H01M 50/529 |
| | | | | 429/179 |
| 2015/0263326 A1 | 9/2015 | Gunther et al. | | |
| 2018/0222150 A1* | 8/2018 | Petrucci | ................... | B32B 7/05 |

FOREIGN PATENT DOCUMENTS

| | | |
|---|---|---|
| DE | 10 2011 015040 A1 | 9/2012 |
| DE | 10 2013 212 348 A1 | 12/2014 |
| DE | 102013212348 A1 | 12/2014 |
| DE | 10 2015 103092 A1 | 9/2015 |

OTHER PUBLICATIONS

International Searching Authority/European Patent Office, International Search Report and Written Opinion of the International Searching Authority, Application No. PCT/EP2019/054433, mailed May 29, 2019, with English translation of the International Search Report, 14 pages.

German Patent Office, Office Action, Application No. 10 2018 112 313.2, mailed Mar. 13, 2019, 7 pages (in German).

China National Intellectual Property Administration, Office Action issued in Chinese application 201980034484.2, dated Jul. 5, 2022, 13 pages (English translation).

* cited by examiner

BATTERY CELL CONNECTOR

CROSS-REFERENCE TO RELATED APPLICATIONS

This application is the national phase entry of international patent application no. PCT/EP2019/054433 filed Feb. 22, 2019 and claims the benefit of German patent application No. 10 2018 112 313.2, filed May 23, 2018, the disclosures of which are incorporated herein by reference in their entirety.

TECHNICAL FIELD

The subject matter relates to a battery cell connector. A battery cell connector according to the subject matter may be formed as an assembly and may be arranged for electrically conductively connecting a first cell terminal of a first electrochemical cell of an electrochemical device to a second cell terminal of a second electrochemical cell of the electrochemical device. An electrochemical device is in particular a battery, preferably a motor vehicle battery. Such a battery may, for example, be a battery of a drive train of the motor vehicle.

BACKGROUND ART

In purely battery-powered electric vehicles (BEV) as well as in plug-in hybrid electric vehicles (PHEV), especially cars, two-wheeled vehicles, ships, airships and the like, batteries are increasingly used in which a large number of electrochemical cells are connected in series and/or parallel to each other. Each individual cell by itself has a low storage capacity and a low cell voltage, for example 4.8 V. By connecting several cells together, however, high battery capacities with high voltages at the same time can be achieved. Battery cells can be lithium-ion battery cells, for example.

Due to the high current flows in vehicles, for example when using batteries as energy storage for the drive train, it is necessary to connect the battery cells among each other with low contact resistances. So-called battery cell connectors, which are known, are particularly suitable for this purpose. The battery cell connectors are usually welded to the poles of the cell terminals, so that a material bond connection is formed. The current flows between the individual cells via this material bond connection. The material bond offers low contact resistance, but has the disadvantage that it can be unstable in the face of mechanical loads and can in particular break in the event of vibrations and sustained mechanical stress.

Especially in applications where the environmental conditions can fluctuate strongly or where the batteries heat up strongly, a so-called "swelling" can occur. Swelling can also be relevant due to age-related changes in the material structure or dimensions of the cells. In this phenomenon the cell connector and/or cell terminals may change in length, e.g. due to temperature fluctuations. A cell connector is usually a flat part, which is arranged between the terminals of the battery cells. The change in length of the flat part caused by the temperature change leads to a mechanical stress of the connection of the flat part with the battery terminal, which in the worst case can lead to a breakage of the electrical connection.

In order to reduce the mechanical stress caused by swelling, cell connectors are known in which the flat part, also called BusBar, is arranged between two clamps, each of which is arranged at a terminal of the battery terminal. For example, a cell connector assembly is known from DE 10 2013 212 348 A1, in which a contact element is connected to the cell connector via a holding device. The holding device is such that the cell connector in the contact element can expand at least in the longitudinal direction.

The assembly known from the state of the art has the disadvantage, however, that the holding force of the cell connector in the contact element must be provided by a holding device arranged for this purpose. The holding device is on the one hand complex to manufacture and on the other hand is also prone to errors.

For this reason, the subject matter was based on the object of providing a cell connector in which the holding device is formed as a terminal clamp and is optimized in its mechanical properties.

SUMMARY OF THE INVENTION

It has been recognized that the terminal clamp must fulfill two conditions. On the one hand, the terminal clamp must be suitable to hold the flat part used to connect the cells in place in a clamping manner and on the other hand, a good electrical contact with the flat part on one side and the terminal of the battery cell on the other side must be ensured. The holding force is exerted on the flat part in particular by a spring force. This spring force requires different material properties than those required to connect the terminal clamp to a pole or terminal of a battery cell.

For this reason, it is proposed that the terminal clamp is bimetallic, where a connection area is formed of a first metal material and a receiving area formed at least partially of a second metal material different from the first metal material.

The cell connector and terminal clamp according to the subject matter are characterized by a low weight, good conductance, low and stable contact resistance. Furthermore, the cell connector can be unmounted without destruction. The manufacturing effort is low. The production can be fully automated. Also the assembly can be fully automated.

The design of the terminal clamp from different metal materials achieves the effect that the terminal clamp is adapted area by area to the different requirements that are placed on it. On the one hand, a metal material of a first area can be selected in such a way that it is suitable for clampingly holding the flat part. Clampingly holding requires a metal material that has particularly good spring properties. However, the metal material required for this purpose is not suitable for forming a homogeneous connection to a terminal of a cell and/or for a good material bond connection to the terminal of the clamp.

The other metal material of the other area can be selected in such a way that it can be combined and connected particularly well with the metal material of the terminal/pole of the battery cell, especially to avoid contact corrosion. When connecting the terminal clamp to the terminal of the battery cell, preferably a homogeneous transition is achieved. However, the metal material required for this is not suitable for exerting a good clamping force on the flat part.

The areas can be a connection area and a receiving area. The areas can be adjacent to each other along the longitudinal axis of the flat part. The connection area can be located at a first end of the flat part and the receiving area at an opposite end of the flat part.

It is proposed that the receiving area is formed from a metallic material with a ratio between yield strength and tensile strength is greater than 70%, advantageously greater than 85%.

The yield strength can be the $R_{eL}$ or $R_{eH}$ value and the tensile strength can be the $R_m$ value. All values can be measured according to ISO 6892, DIN 50154, ASTME E8 or ASTM E21. The specimen geometry for the materials is derived according to DIN 50125. Due to the required ratio of yield strength to tensile strength, a good spring elasticity is achieved in the receiving area, so that the receiving area can hold the flat part particularly well in a clamping manner.

According to an embodiment, it is proposed that the receiving area is formed from its spring steel. Here, spring steels according to DIN EN 10089, DIN EN 10092, DIN EN 10132 or DIN EN 10151, especially X10CrNi18-8, 38Si7, 52CrMoV4, 51CrV4, or 61SiCr7, C67E/C67S are particularly suitable.

The receiving area has special mechanical requirements, especially with regard to its clamping force exerted on the flat part. The connection area, on the other hand, has special requirements with regard to its connectivity with the battery cell terminal. For this reason, the terminal clamp must have a transition between the receiving area and the connection area to provide the different metal materials. It is proposed that the receiving area is connected to the connection area at the front end with an overlap. It is also possible that the receiving area is butt-jointed to the connection area at the front end. In particular, a butt joint between two flat parts, which form the connection area on the one hand and the receiving area on the other hand, is preferred.

A particularly good conductivity of the terminal clamp is achieved by connecting the receiving area to the connection area in a material bond. Friction welding processes are particularly suitable for this purpose, here, especially an ultrasonic welding process. Friction stir welding as well as ultrasonic roll seam welding is preferred.

The flat part is received in a clamped manner by the receiving area. In order to ensure the largest possible contact area, it is proposed that the receiving area and the connection area each consist of a flat metal part. In this way, the flat part is received flatly by the receiving area and the connection area can be connected flatly with a terminal of the battery cell.

In order to be able to exert a sufficiently large clamping force on the flat part, it is proposed that the flat part is clamped in the receiving area. In order to achieve a good clamping effect, it is proposed that the receiving area is formed by two opposing legs.

The legs preferably form a U, whereby the clear span between the legs is less than a material thickness of the flat part. This leads to an interference fit between the legs and the flat part, so that the flat part in its mounted position presses the legs apart. The resulting restoring force of the legs causes the flat part to be clamped between the legs.

A transition area is provided between the legs, which is especially approximately circular, preferably semi-circular. The transition area connects the opposing legs with each other. In their longitudinal extent, the legs do not cross each other, so that the legs form an opening on the side opposite the transition area. The flat part can be inserted into this opening.

For good electrical conductivity on the one hand, but low weight on the other hand, it is proposed that the flat part is made of an aluminum material or a coated aluminum material, especially aluminum material coated with a copper material. On the other hand, it is also possible, for example if the terminal clamp is partly made of aluminium, that the flat part is made of a copper material or a coated copper material, especially copper material coated with an aluminium material.

The two legs with the transition area form the mounting area in a U-shape. The inner surfaces of the legs face each other. At least one of the inner surfaces of the legs has a profiled surface complementary to the flat part, so that the inner surface in particular engages with a surface of the flat part in a tongue-and-groove fashion. The inner surface can have at least one projection and/or one recess and the flat part can have at least one recess and/or one projection corresponding to it. In this way, the flat part and the inner surface interlock in the assembled state in a tongue-and-groove manner.

It is also proposed that at least one inner surface or a surface of the flat part which is in contact with the inner surface has at least one projection and the respective opposite inner surface or surface of the flat part has at least one corresponding recess.

According to one design example, it is proposed that the projection and the recess have a longitudinal extent which is transverse, preferably perpendicular to the longitudinal extent of the legs and/or parallel to the longitudinal extent of the flat part. This ensures in the assembled state that the projection and the recess interlock transversely to the direction of insertion of the flat part into the opening between the legs.

For a good conductive connection of the battery cell connector to a terminal of a cell, it is proposed that the connection area is connected in a material bond to the terminal (pole) of a cell to be contacted, in particular by laser welding or ultrasonic welding, preferably torsional ultrasonic welding. In both laser welding and ultrasonic welding, the welding energy is introduced very specifically into the weld nodes. The areas surrounding the weld joint are thereby only heated up very little. This prevents the electrochemical cell in the battery cell from being damaged.

For a particularly good positive-locking connection between the flat part and the legs of the connecting part in the connected state, it is proposed that at least two projections and recesses running parallel to each other are arranged on the adjacent surfaces of the flat part and legs. The flat part is preferably provided with a projection or recess on one surface only, the opposite surface is preferably flat.

According to one embodiment, it is proposed that at least two surfaces of the flat part and the leg that are in contact with each other in the assembled state have projections and recesses running complementarily to each other, and that the projections and recesses interlock transversely to a longitudinal extent of the legs. This results in a good positive fit between the legs and the flat part, so that in the assembled state a high extraction force is required to release the flat part from the opening between the legs.

The joining zone between the connection area and the terminal of the cell is preferably distanced from the area where the terminal clamp is mechanically loaded. Therefore, it is proposed that a joining zone between the material of the connection area and the material of the receiving area is located in the area of at least one leg or in the transition area. In the receiving area, the terminal clamp is mechanically loaded, in particular stretched and/or compressed and/or twisted, by the clamping of the flat part. The resulting mechanical deformation can have a negative effect on the connection between the terminal clamp and the terminal in the connection area. In particular, mechanical tensile and/or compressive forces can cause the connection to detach over time. This could lead to an interruption of the electrical connection and the battery may no longer be usable.

According to an embodiment, it is proposed that the connection area is connected to the terminal of the cell away from the joining zone in the receiving area. As a result, the force that is applied to the opening of the receiving area during the joining of the flat part is not coupled into the connection area and in particular into the area where the connection area is connected to the terminal of the cell.

The terminal clamp is preferably hook-shaped in a longitudinal section. Preferably, the longitudinal extent of the connection area is protruding beyond a normal projection of the inner surface of one leg onto the connection area. This means that the longitudinal extent of the connection area exceeds the longitudinal extension of the legs of the receiving area. The connection to the terminal of the cell is outside the area spanned by the legs.

According to an embodiment, it is proposed that the longitudinal extent of the connection area with the first leg of the receiving area connected to it is greater than the longitudinal extent of the second leg of the receiving area.

The receiving area can be formed by one leg and parts of the connection area. The second leg of the receiving area is connected to the first leg via the transition area. Starting from the first leg, the connection area is arranged on the opposite side of the transition area.

BRIEF DESCRIPTION OF THE DRAWINGS

In the following, the subject matter will be explained in more detail by means of a drawing showing examples. In the drawing show.

DETAILED DESCRIPTION OF SPECIFIC EMBODIMENTS

Figure 1A:
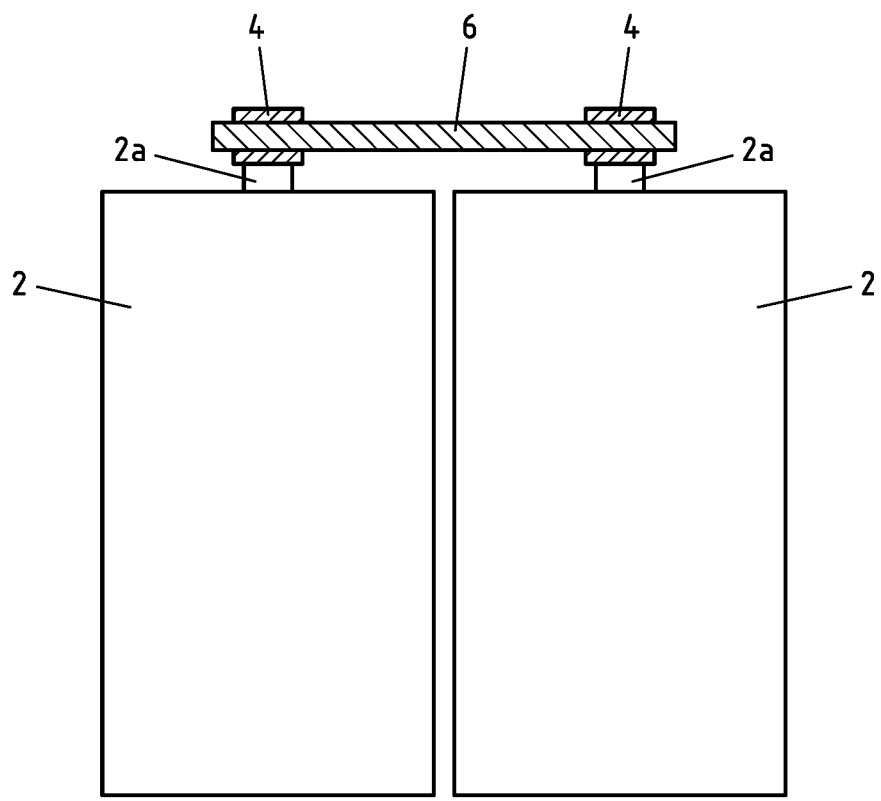
FIG. 1a a side view of a battery cell connector with battery cells.

FIG. 1a shows two battery cells 2, each with one pole 2a. One terminal clamp 4 is welded to each pole. A flat part 6 is arranged in a clamped manner between the terminal clamps 4. Current flows between the two battery cells 2 from one pole 2a via a terminal clamp 4, the flat part 6, and the respective other terminal clamp 4 to the other pole 2a.

Figure 1B:
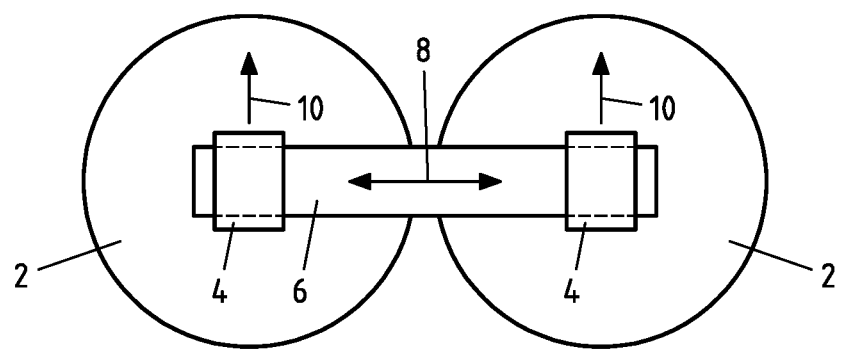
FIG. 1b a top view of a battery cell connector with battery cells.

FIG. 1b shows a top view of such an arrangement with the terminal clamps 4 and the flat part 6.

During operation, is has to be made sure that the flat part 6 does not detach from the terminals clamps 4. On the other hand, however, during operation, the flat part may expand or contract in its longitudinal extension 8 due to thermal expansion. This "swelling" leads to a mechanical load on the terminal clamps if the flat part 6 is firmly connected to the terminal clamps 4.

According to the subject matter, however, the flat part 6 is clamped to the terminal clamp with a degree of freedom along its longitudinal extent 8 so that the flat part 6 can move, expand and/or contract along its longitudinal extent 8 in the terminal clamps 4. In a direction 10 perpendicular to the longitudinal extent 8, the flat part 6 is, however, held at least positively-lockingly in the terminal clamps 4. In direction 10, the flat part 6 can be removed from terminal clamp 4.

Figure 2A:
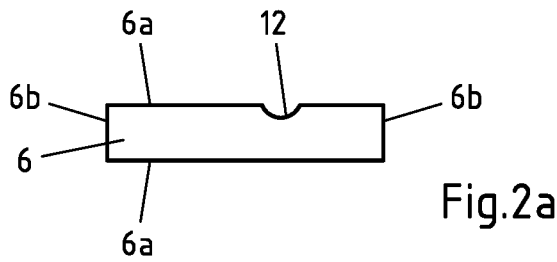
FIG. 2a-e different cross sections of a flat part.
Figure 2B:
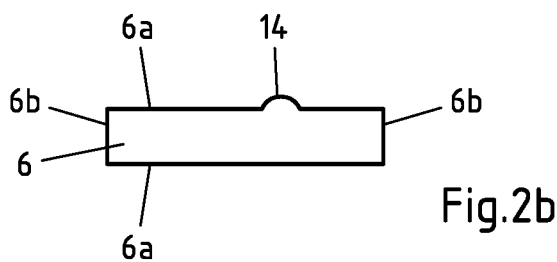

FIGS. 2a-e show a section parallel to direction 10 through the flat part 6. The flat part 6 has two wide surfaces 6a and two narrow surfaces 6b. On at least one wide surface 6a, a recess 12 or a projection 14 is provided. This is shown in FIGS. 2a and b.

Figure 2C:
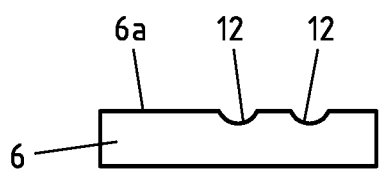
Figure 2D:
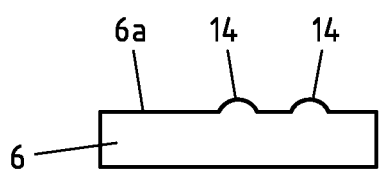
Figure 2E:
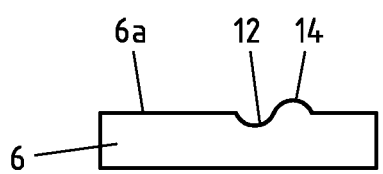

There can also be two recesses 12 or two projections 14 on a wide surface 6a, as shown in FIGS. 2c and d. It is also possible to have both a recess 12 and a projection 14 on a wide surface 6a, as shown in FIG. 2e.

Needless to say, more than two recesses 12 and/or projections 14 may be provided on a wide surface 6a. Also, recesses 12 and projections 14 may be located simultaneously on opposite wide surfaces 6a.

Figure 3:
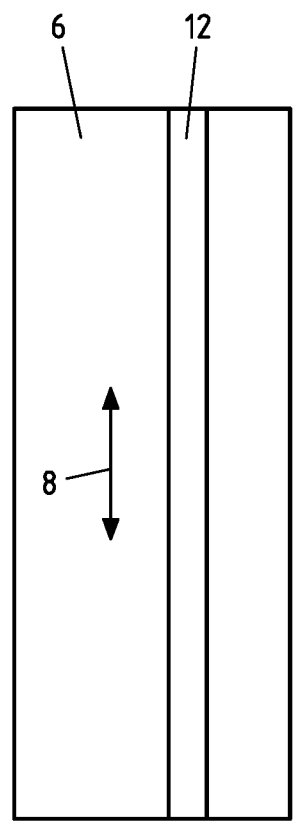
FIG. 3 a top view of a flat part.

A top view of a flat part 6 is shown in FIG. 3, showing that recess 12 extends along the longitudinal extent 8 of flat part 6.

FIGS. 4a to e show different terminal clamps 16 corresponding to the respective flat parts 6 of FIGS. 2a-e.

A terminal clamp 16 has a receiving area 18 and a connection area 20. The receiving area 18 is formed by two legs 18a, 18b and a transition area 18c. The transition area 18c connects the two legs 18a, 18b with each other. The legs 18a, 18b have inner surfaces 18a', 18b' facing each other. The clear span 22 between the inner surfaces 18a', 18b' is preferably smaller than the extent of the flat part 6 along its narrow surface 6b.

Figure 4A:
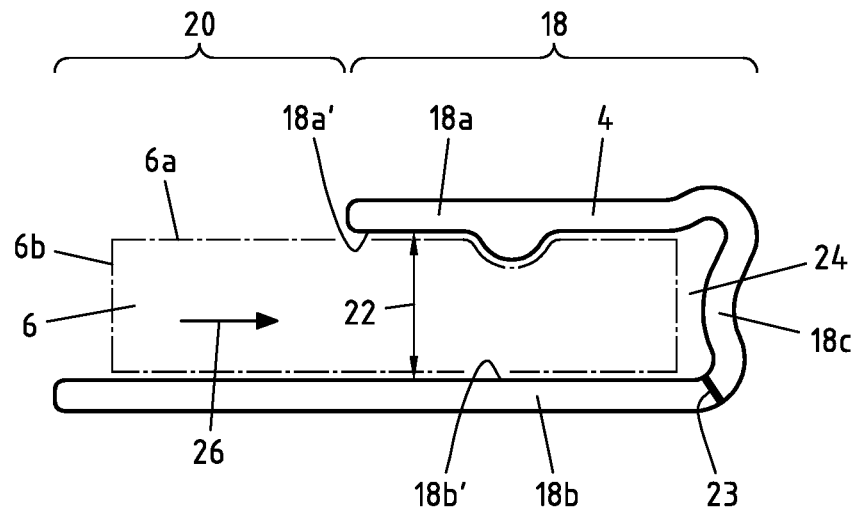
FIG. 4a-e longitudinal sections of a terminal clamp corresponding to the flat parts according to FIG. 2a-e.
Figure 4B:
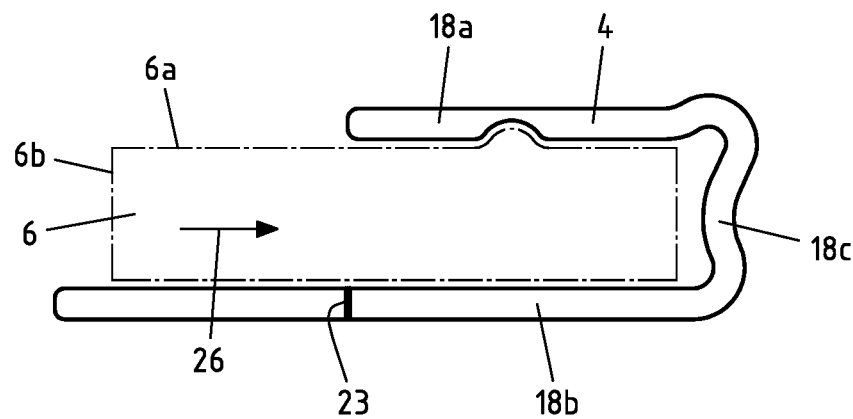
Figure 4C:
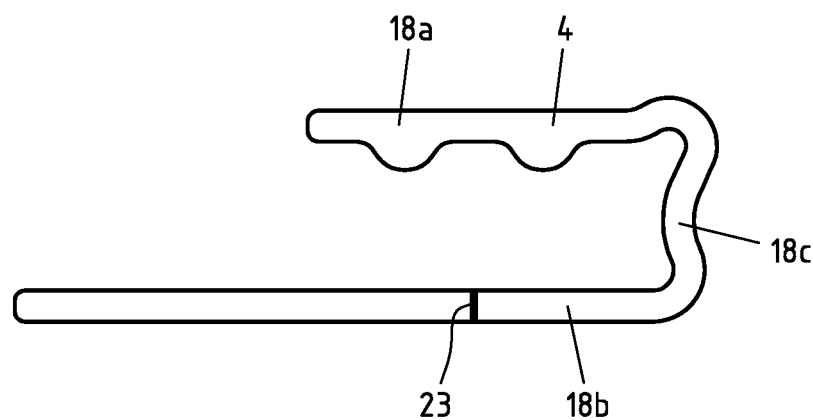
Figure 4D:
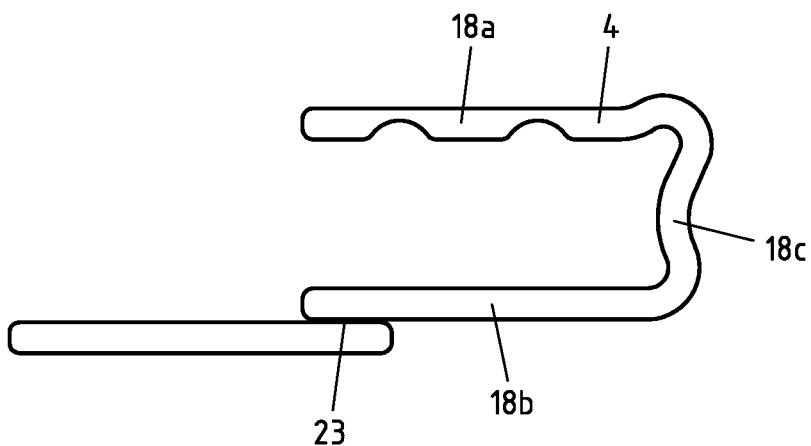
Figure 4E:
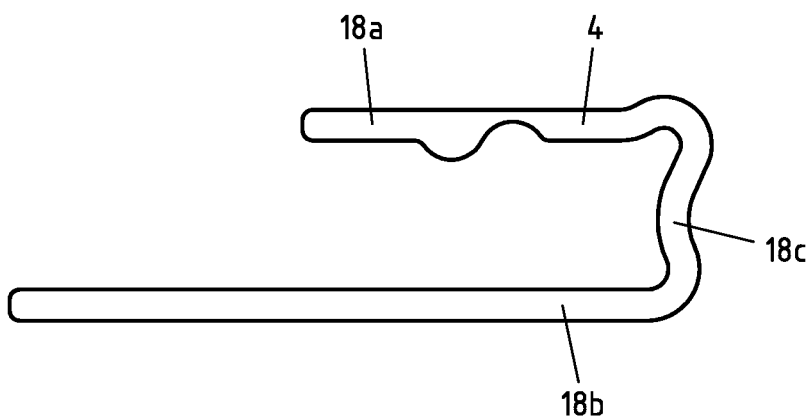

The terminal clamp 16 is made of two different metal materials, whereby the receiving area 18, in particular the legs 18a, 18b as well as the transition area 18c are formed at least in parts from a first metal material and the connection area 20 is formed at least in parts from a second metal material. A joining zone 23 between the different metal materials can be at a transition between the leg 18b and the transition area 18c, as shown in FIG. 4a. A joining zone 23 can also be at the transition between the receiving area 18 and the connection area 20, as shown in FIG. 4b. A joining zone 23 can also be in the area of the leg 18b as shown in FIG. 4c. The joining zone 23 can also be in an overlap area as shown in FIG. 4d. The joining zone is preferably arranged in such a way that it is free from mechanical stress caused by the spring tension of the legs.

The metal material from which at least one of the legs 18a and the transition area 18c is formed is preferably a spring steel, whereas the metal material from which the connection area 20 is formed is well suited for a material bond connection with terminal 2a of battery cell 2.

To achieve a good clamping force onto the flat part 6, the transition area 18c has a curvature that is inclined in the direction of the opening 24 between the legs 18a, 18b. The bending radii between the legs 18a, b and the transition area 18c are opposite to the bending radius of the curvature of the transition area 18c. Starting from leg 18a, the transition area 18c may initially be bent in a direction away from leg 18b. In a narrow bending radius, the transition area 18c can then be bent in the direction of the leg 18b. Thus, the transition area has an upward pointing "head" which protrudes from the upper face of the leg 18a.

Subsequently, the transition area 18c can be curved in a further bending radius in the direction of the opening 24. Starting from this, the transition area 18c can again be bent in a narrow bending radius towards the connection area 20 and extend into the leg 18b.

This multiple bending in the transition area results in a particularly good clamping effect of the receiving area 18.

For assembly, the flat part 6 is pushed into the opening 24 in the insertion direction 26. By this, the legs 18a, 18b are spread apart. The resulting restoring force results in a spring force on the wide surfaces 6a of the flat part 6 so that it is held between the legs 18a, 18b in a clamped manner.

Figure 5:
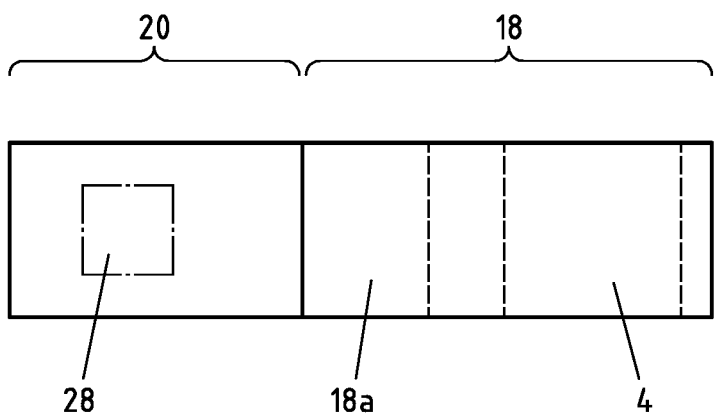
FIG. 5 a top view of a terminal clamp.

This mechanical tension results in a mechanical load on the legs 18a, 18b. It must be avoided that this mechanical stress is transferred to the material bond connection between the pole 2a and the connection area 20. For this reason, as shown in FIG. 5, the connection area 20 protrudes beyond the receiving area 18. In particular, a normal projection of the legs 18a, 18b onto each other shows that the connection area 20 is longer than the longest of the two legs 18a, 18b. There is a zone 28 in the connection area where a material bond connection between terminal 2a and terminal clamp 4 is made.

FIGS. 4b-e show different types of terminal clamps 4 which are designed to accept the corresponding flat parts according to FIGS. 2b-e.

LIST OF REFERENCE SIGNS

2 Battery cell
2a Terminal
4 Terminal clamp
6 Flat part
6a Wide surface
6b Narrow surface
8 Longitudinal extent
10 Transversal direction
12 Recess
14 Projection
18 Receiving area
18a,b Leg
18c Transition area
20 Connection area
22 Clear width
23 Joining zone
24 Opening
26 Insertion direction

What is claimed is:

1. Battery cell connector comprising:
a battery terminal clamp having a first leg and an opposing second leg and a transition area connecting the first and second legs to each other,
wherein the terminal clamp is hook shaped in a longitudinal section, with a receiving area arranged to clampingly receive a flat part through an opening spanned by the legs, the opening being opposite from the transition area,
wherein the terminal clamp is bimetallic, wherein the first leg includes an electrical connection area made from a first metal material and wherein at least the second leg and the transition area is made from a second metal material different from the first metal material,
wherein the electrical connection area is arranged for connecting to one terminal of a battery cell in a material bond,
wherein the second metal material is a spring steel, and
wherein the second metal material is butt-jointed to the first metal material.

2. Battery cell connector according to claim 1,
wherein the receiving area is at least partially formed from a metallic material whose ratio of yield strength to tensile strength is above 70%, advantageously above 85%.

3. Battery cell connector according to claim 1,
wherein the second metal material is made of a spring steel characterized by any of DIN EN 10089, DIN EN 10092, DIN EN 10132 or DIN EN 10151.

4. Battery cell connector according to claim 1,
wherein the second metal material is joined to the first metal material in a material bond, in particular by means of friction welding, preferably friction stir welding, ultrasonic welding, preferably ultrasonic roll seam welding.

5. Battery cell connector according to claim 1,
wherein the receiving area and the electrical connection area are each formed from a flat metal part.

6. Battery cell connector according to claim 1,
wherein a clear span between the opposing legs of the receiving area being less than a material thickness of the flat part.

7. Battery cell connector according to claim 1,
wherein the legs each have an inner surface which faces towards the other leg, wherein in particular at least one inner surface engaging with the flat part in a tongue-and-groove fashion.

8. Battery cell connector according to claim 6,
wherein at least one inner surface or a surface of the flat part lying against the inner surface has a projection and the respective opposite inner surface or surface of the flat part has a recess corresponding thereto.

9. Battery cell connector according to claim 8,
wherein the projection and the recess have a longitudinal extent which is transverse, preferably perpendicular to the longitudinal extent of the legs and/or parallel to the longitudinal extent of the flat part.

10. Battery cell connector according to claim 1,
wherein the electrical connection area is connected to the pole of a cell to be contacted in a material bond, in particular by means of laser welding or ultrasonic welding, preferably by torsional ultrasonic welding.

11. Battery cell connector according to claim 8,
wherein at least two projections and recesses running parallel to one another are arranged on the surfaces of the flat part and the legs that lie against one another.

12. Battery cell connector according to claim 8,
wherein the at least one projection or the at least one receptacle is arranged in only one surface of the flat part.

13. Battery cell connector according to one of the claim 8,
wherein at least two surfaces of the flat part and leg which, in the assembled state, lie against one another, have projections and recesses running in a complementary manner to one another, and in that the projections and recesses interlock transversely to a longitudinal extent of the legs.

14. Battery cell connector according to claim 1,
wherein a joining zone between the second metal material and the first metal material is located in the area of at least one leg or in the transition area.

15. Battery cell connectors according to claim 14,
wherein the electrical connection area is connected to the pole of the cell away from the joining zone.

16. Battery cell connector according to claim 1,
wherein the electrical connection area projects in its longitudinal extent beyond a normal projection of the inner surface onto the electrical connection area and in particular in that the connection with the pole of the cell lies outside the normal projection of the inner surface onto the electrical connection area.

17. Battery cell connector according to claim 1, wherein the transition area connecting the legs to each other is perpendicular to the longitudinal extent of the connection area.

18. Battery cell connector according to claim 1, wherein the receiving area is formed from the first and second legs and the transition area connecting the legs to each other.

* * * * *